E. R. ZEHNER.
BELLY ROLLING MACHINE.
APPLICATION FILED DEC. 2, 1908.
976,113.
Patented Nov. 15, 1910.
2 SHEETS—SHEET 1.
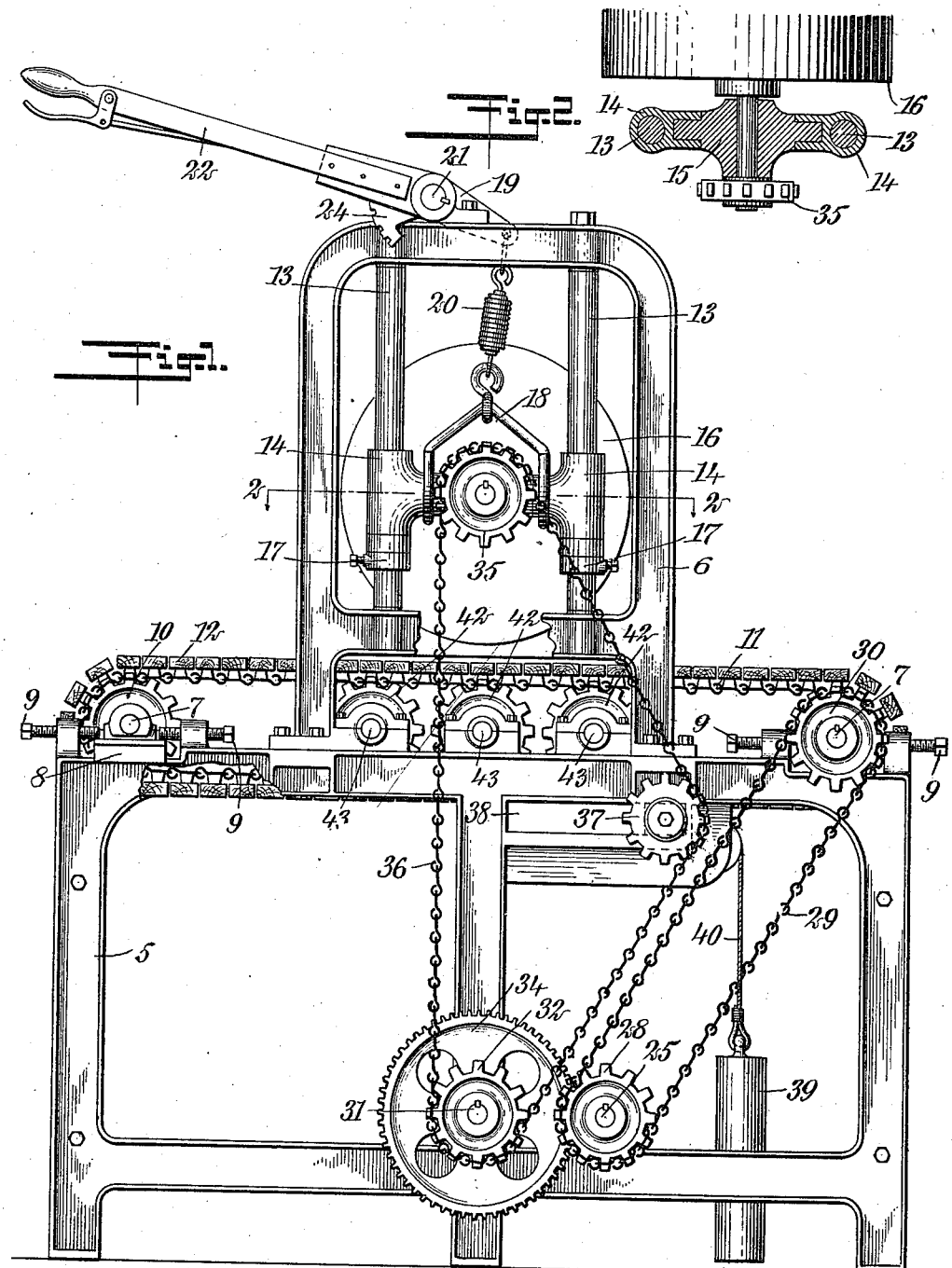
WITNESSES
INVENTOR
Ernest R. Zehner
BY
ATTORNEYS E. R. ZEHNER.
BELLY ROLLING MACHINE.
APPLICATION FILED DEC. 2, 1908.
976,113.
Patented Nov. 15, 1910.
2 SHEETS—SHEET 2.
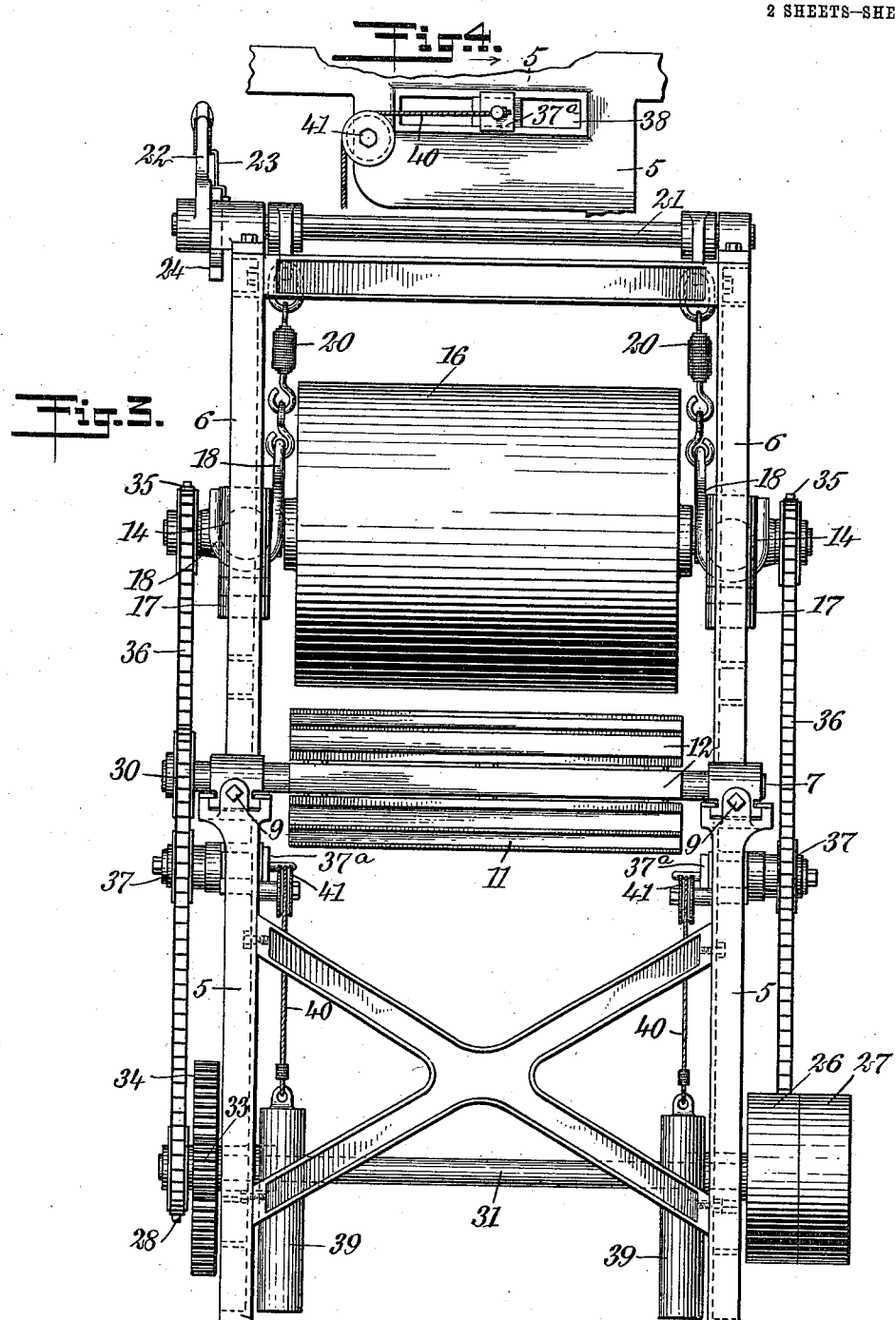
WITNESSES
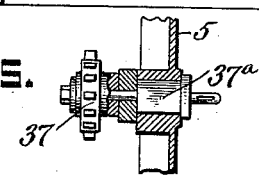
INVENTOR
Ernest R. Zehner
BY Munn & Co.
ATTORNEYS

UNITED STATES PATENT OFFICE.

ERNEST R. ZEHNER, OF TOLEDO, OHIO.

BELLY-ROLLING MACHINE.

976,113.　　　　Specification of Letters Patent.　　Patented Nov. 15, 1910.

Application filed December 2, 1908. Serial No. 465,653.

*To all whom it may concern:*

Be it known that I, ERNEST R. ZEHNER, a citizen of the United States, and a resident of Toledo, in the county of Lucas and State of Ohio, have invented a new and Improved Belly-Rolling Machine, of which the following is a full, clear, and exact description.

The invention is a machine for rolling the bellies of pigs to make the meat firm and compact and to give it a better appearance, all of which is effected by my improvements consisting in general of an endless belly carrier, a meat flattening roll coöperating with the carrier and movable therefrom in the pressing or flattening operation whereby to subject the belly to a uniform pressure, means for driving the roll, and means operatively connected with the driving means to maintain the elements of the latter in working engagement in any position of the flattening roll.

The invention further contemplates a mounting for the flattening roll which will admit of the roll moving closer to or farther from the carrier at one side than at the other, and means for varying the normal distance between the roll and carrier.

Reference is to be had to the accompanying drawings forming a part of this specification, in which similar characters of reference indicate corresponding parts in all the views.

Figure 1 is a side elevation of a belly rolling machine constructed in accordance with my invention; Fig. 2 is a fragmentary section substantially on the line 2—2 of Fig. 1; Fig. 3 is an end elevation of the machine; Fig. 4 is a fragmentary view of the inside of one of the side frames, showing the means for automatically adjusting the roll-driving mechanism; and Fig. 5 is a section substantially on the line 5 of Fig. 4.

The working parts of the machine are carried on a suitable frame which, in the present embodiment of my invention, is shown to consist of side frames 5, rigidly connected at one or more points, and having superposed upright frames 6, arranged at or near the center and also rigidly secured together, as is best observed in Fig. 3. Near each end of the side frames 5 is journaled a cross-shaft 7, in an adjustable bearing 8, which is locked in adjusted position by oppositely-directed set-screws 9, threaded through lugs or projections integral or otherwise rigid with the frames 5. Each shaft 7 carries at the inside of the frames 5, sprocket wheels 10, over which an endless chain carrier 11 travels, the links of the carrier being provided with cross-slats 12 which present a flat surface when the chain is straightened out. The frames 6 each have a pair of spaced upright bars 13 on which are slidable carriers in the nature of T's 14, receiving the trunnions of bearings 15, in which is journaled a large smooth meat flattening or pressing roll 16. The T's 14 are limited in their downward movement by collars 17 adjustably secured to the bars 13, and each set of T's is engaged by a hook 18 which is connected to a crank-arm 19 through a spring 20, the crank-arms being attached to a cross-shaft 21 which is provided with a lever 22 having a spring latch 23 adapted to be engaged in the teeth of an arc 24 fixed to the machine frame.

In the lower portion of the side frames 5 is journaled a main or driving shaft 25, having the usual fixed and loose pulleys 26 and 27 respectively, at one end, and a sprocket wheel 28 secured at its opposite end, which drives, by means of a chain 29, a sprocket wheel 30 fixed to the extended end of one of the shafts 7 and serving to drive the endless carrier. A shaft 31, journaled in the side frames 5 at one side of the driving shaft 25, is provided with a sprocket wheel 32, at each end and is driven from the driving shaft by a pinion 33 meshing with a gear 34. The roll axle or shaft is extended to carry at each end a sprocket wheel 35 which is driven by a chain 36 passing over one of the sprocket wheels 32 and also passing about a sprocket wheel 37 which is carried on a bearing or block 37ª slidable in a horizontal slot 38 formed in the frame. The sliding blocks or bearings of the sprocket wheel 37 are maintained under a constant outward pull by weights 39, each of which has a flexible connection with its respective block by a flexible member 40, which passes over a sheave 41 arranged at the outer end of the slot 38, as clearly shown in Fig. 4.

The endless carrier is supported directly under the roll by a number of pairs of sprocket wheels 42, three pairs being shown, each pair being carried on a cross-shaft 43.

In the operation of the machine, the flattening roll is adjusted a distance above the carrier commensurate with the thickness of the belly to be rolled, the adjustment being effected by the lever 22. The bellies are deposited on the carrier either manually or by a suitable conveyer, and as they pass under the roll are flattened or ironed out, each part being placed under a uniform pressure by reason of the tilting movement of the roll on the trunnion bearings. As the roll rides up and down on the vertical bars in its operation, the driving chains therefor are maintained under constant tension by the idle sprockets connected with the counterweights, the springs 20 in the action of the roll serving to break its fall and relieve the parts of undue shock, as when rolling bellies of irregular thickness.

Having thus described my invention, I claim as new and desire to secure by Letters Patent:

1. The combination of a carrier, a meat flattening roll movable to and from the carrier and coöperating therewith, and means for cushioning the fall of the roll in moving toward the carrier.

2. The combination of a frame, an endless carrier carried by the frame, bearings movable to and from the carrier, a meat flattening roll coöperating with the carrier and journaled in said bearings, a shaft journaled in the frame having crank-arms, connections between the bearings and crank-arms, and a lever for operating the shaft.

3. The combination of a carrier, a roll slidable to and from the carrier, and resilient means suspending the roll.

4. The combination of a carrier, a meat roll movable in a vertical direction to and from the carrier, a shaft having crank-arms, means connecting the crank-arms to opposite ends of the roll, and a manually-operated lever for operating the shaft.

5. The combination of a belly carrier, a meat flattening roll movable to and from the carrier and coacting therewith, and resilient means supporting the roll, tending to draw it from the carrier.

6. The combination of a belly carrier, a meat flattening roll coacting with the carrier, slidable bearings in which the roll is journaled to rock in a plane passing through the axis of the roll and hangers supporting the bearings.

7. In a belly rolling machine, a frame having upright guide-bars spaced apart and arranged at each side, carriers slidable on the guides, bearings having trunnions at opposite sides, mounted to rock on the carriers, a flattening roll journaled in the bearings, a shaft journaled on the frame above the flattening roll, an operating lever connected to the shaft, arms attached to the shaft, a spring suspended from each arm, and a hook carried by each spring and in supporting engagement with the carriers of the adjacent bearing.

8. In a belly rolling machine, a meat flattening roll suspended to freely tilt from side to side to conform to the inequalities of the meat.

9. In a belly rolling machine, a meat flattening roll mounted to tilt from side to side to conform to the inequalities of the meat, and hangers suspending the roll, each hanger having a resilient member in its length.

In testimony whereof I have signed my name to this specification in the presence of two subscribing witnesses.

ERNEST R. ZEHNER.

Witnesses:
  CURTIS S. WISE,
  EARL SCHRODER.